M. G. HUBBARD.
Mower.
No. 45,246. Patented Nov. 29, 1864.
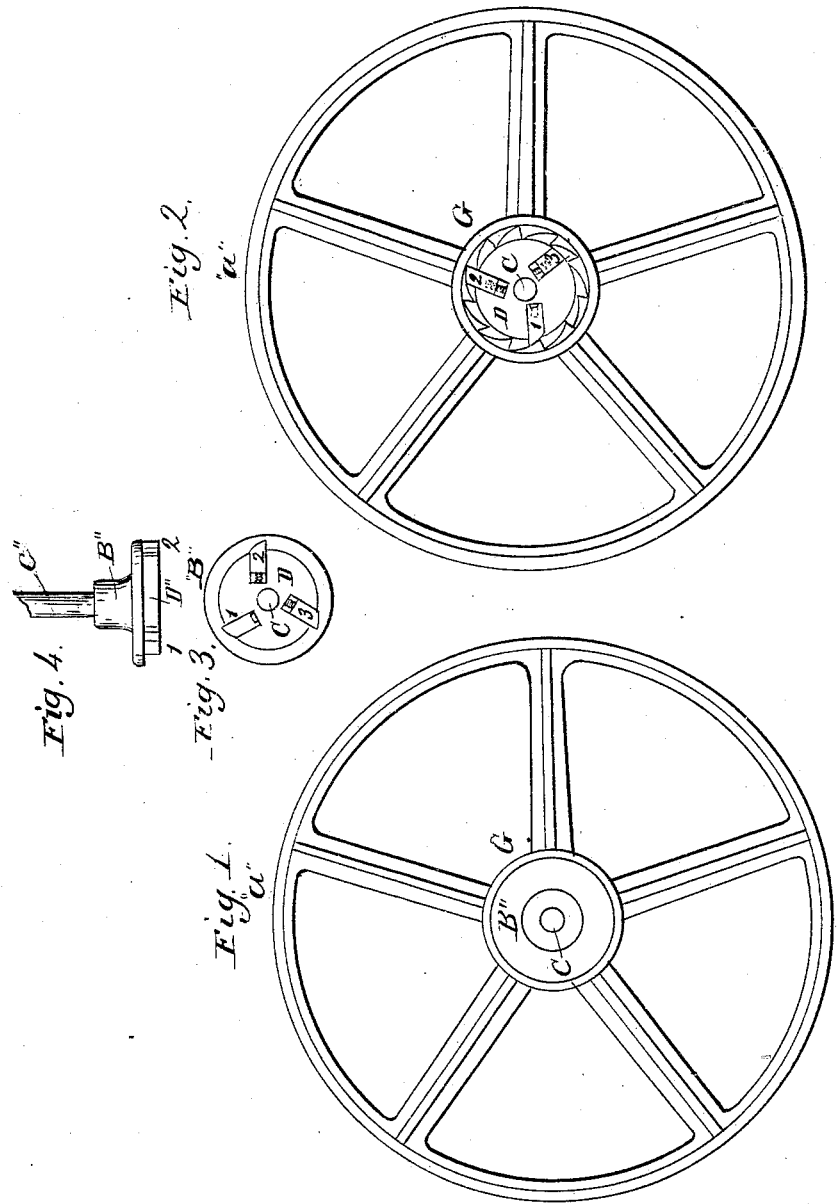

UNITED STATES PATENT OFFICE.

M. G. HUBBARD, OF SYRACUSE, NEW YORK.

IMPROVEMENT IN MOWING-MACHINES.

Specification forming part of Letters Patent No. 45,246, dated November 29, 1864.

*To all whom it may concern:*

Be it known that I, MOSES G. HUBBARD, of the city of Syracuse, in the State of New York, have invented certain new and useful Improvements in Mowing-Machines, relating to the construction of their driving-wheels and their attachment to the main shaft by a new improved ratcheted connection; and I hereby declare the following to be a full and clear description thereof, reference being had to the accompanying drawings, in which—

Figure 1 is an outside view of my improved driving-wheel. Fig. 2 shows the internal arrangement of the ratchet-connection to the main shaft. Fig. 3 represents the opposite side of hub B, showing the form and arrangement of the dogs 1, 2, and 3. Fig. 4 is a detached view of the hub B and a short piece of the main shaft C.

In Fig. 2, A represents one of my driving-wheels, being about three feet in diameter, and having a central ratchet-ring cast thereon, about six inches in diameter, and having internal ratchet-teeth, as shown. This wheel is loose on the shaft, and the hub B and dog-holder D being cast in one piece and keyed to the shaft. I make the dogs 1, 2, and 3 about one inch square, and they play freely in the spaces in the dog-holder D, and are pressed outward by the small coil-springs in their inner ends. These ratchet-teeth and dogs are so arranged with respect to each other that while one of the dogs is fully in place in the ratchet the second dog will be one-third in, and the third dog will be two-thirds in place, so that the wheel will only move one-third of a ratchet-tooth backward before one of the dogs will snap into place and be ready for work. The object of this arrangement is to form as quick a "take-up" in the ratchet-connection as possible without using too fine ratchet-teeth.

My improvement in constructing the driving-wheel consists in arranging a driving-wheel in the form which we call the "star-wheel," it having five spokes so arranged that no spoke will be opposite another, and forming all of the parts of a uniform or nearly uniform thickness as is clearly shown in Fig. 1. This arrangement becomes more necessary when used with a central ratchet, because it is necessary to attain considerably greater strength in the wheel when used in this way, and I have tried many experiments to attain the strongest arrangement of the parts to make the lightest practicable wheel, and one that will cool in casting with the least possible strain. I have found that this star-wheel is all that we had desired in those respects, and we have finally adopted it as the best arrangement of parts of the wheel for the purposes named; and with this improved wheel we can use the central ratchet-clutch as described, with the best results that we have ever realized in any previous arrangement for the purposes described. The results obtained from this peculiar form of construction of the driving-wheels of mowing-machines, and from the peculiar plan and arrangement of the ratchet and dogs therein are only necessary in the construction of mowing-machines, and in these machines they become of great importance, for the reason that these machines are used by drawing them over rough surfaces of land, and their powerful machinery is operated by the traction of their drive-wheels on the ground, and as they require to be built as light as possible, on account of their draft and on account of their cost, it becomes of great importance that their driving-wheels should be constructed upon the best possible principle for attaining such results as strength, lightness, and cheapness, especially when they drive by a central ratchet-connection they require to be of unusual strength, and the peculiar plan and construction of this my improved ratchet-connection is specially and only valuable in its peculiar merit when applied to the mowing-machines on account of its almost instantaneous take-up, which causes the cutters to move laterally the instant the machine starts ahead, while with any previous form of ratchet-connection that I have ever seen in these machines the cutters would often advance considerably in the grass before they commenced to move laterally, which would clog the cutting apparatus and cause serious delay and trouble.

Having thus fully described my improvements in mowing-machines, what I claim therein as new, and desire to secure by Letters Patent, is—

The combination and arrangement of the ratchet-ring and dogs in the driving-wheel of a mowing-machine, substantially as and for the purposes set forth.

M. G. HUBBARD.

Witnesses:
 A. A. CARPENTER,
 C. J. LYSTER.